A. P. WOLFE.
BEAN SNIPPING MACHINE.
APPLICATION FILED AUG. 12, 1919.

1,359,559.

Patented Nov. 23, 1920.

INVENTOR
Arthur P. Wolfe
BY
Cyrus V. Anderson
ATTORNEY.

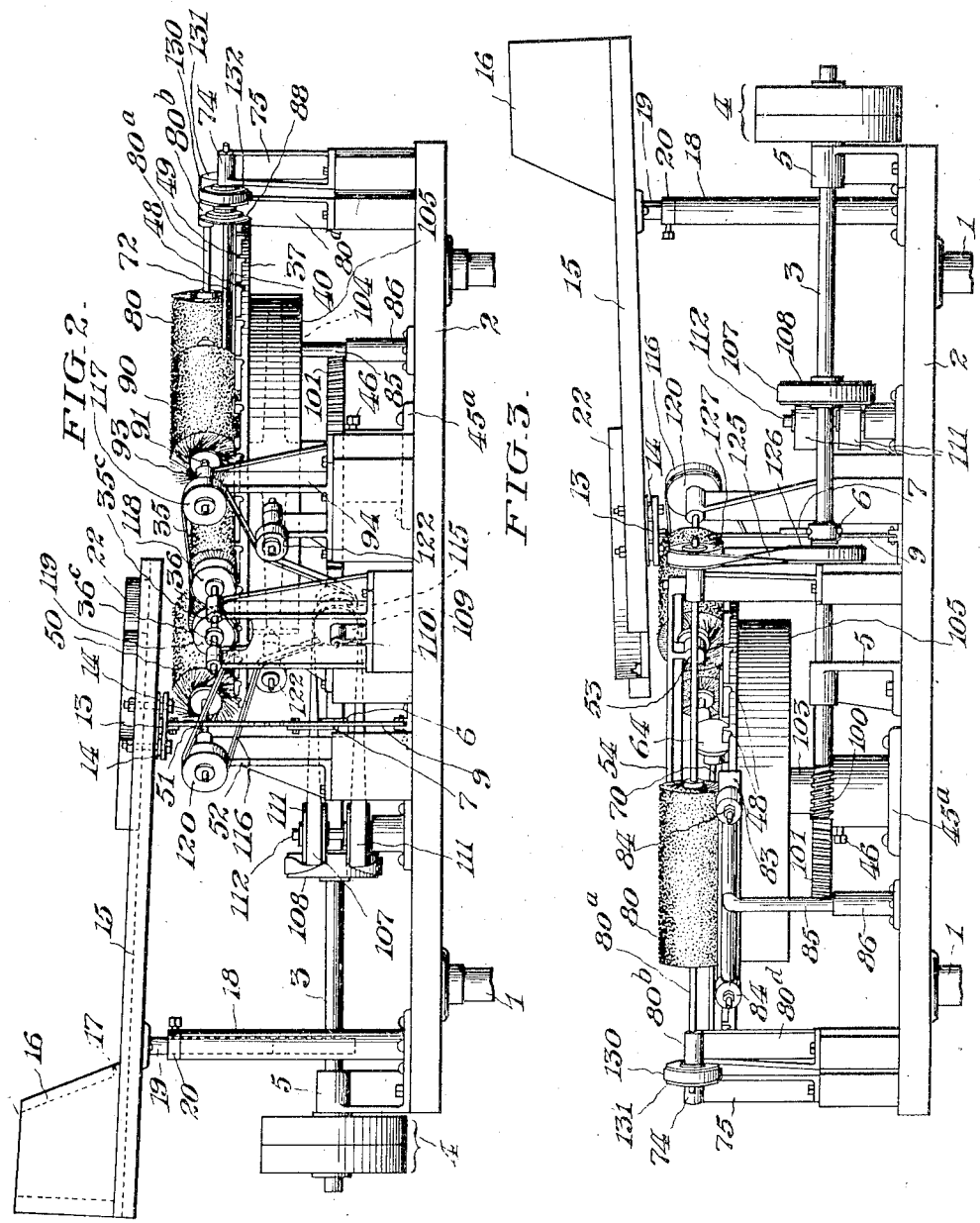

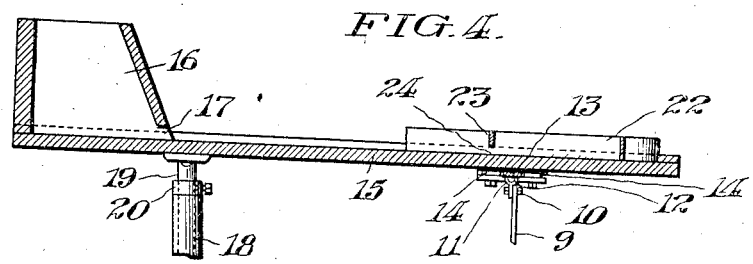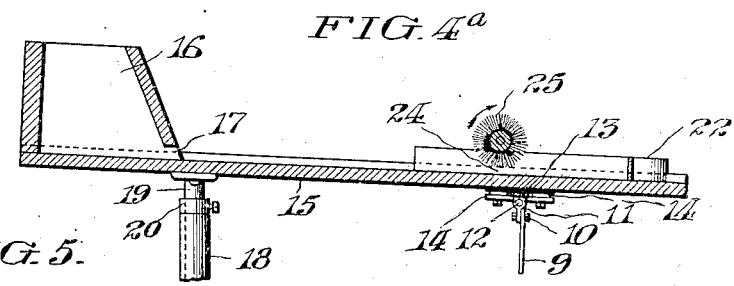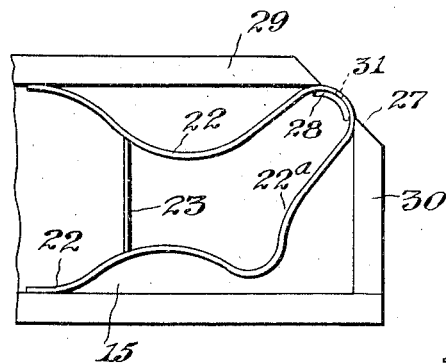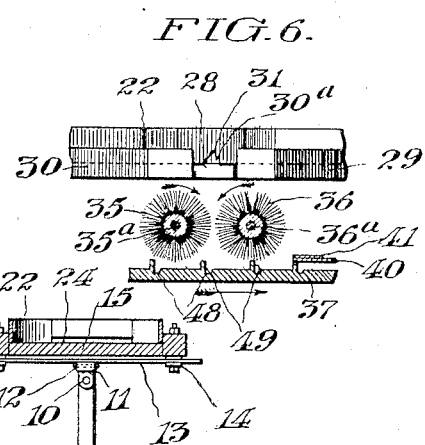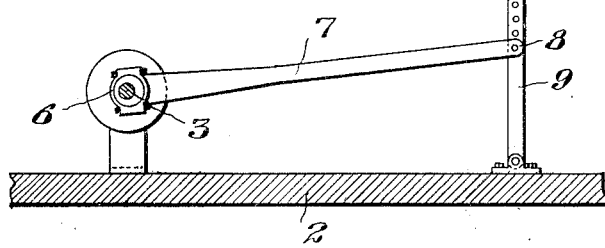

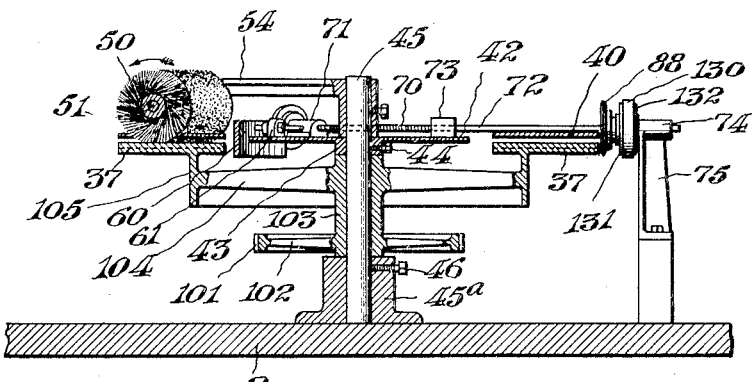
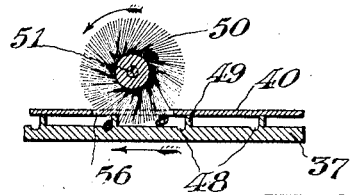
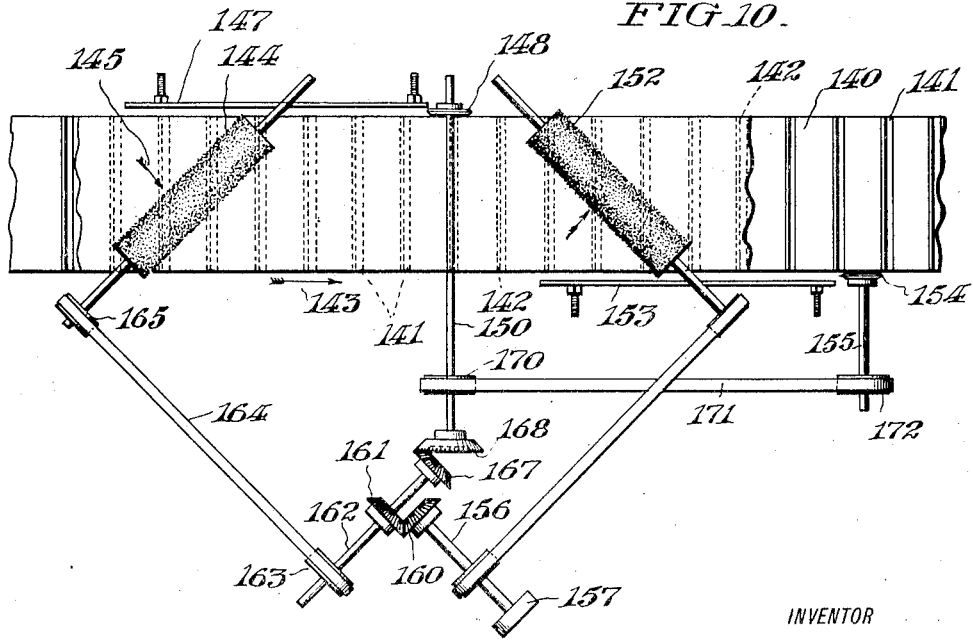

UNITED STATES PATENT OFFICE.

ARTHUR P. WOLFE, OF PHILADELPHIA, PENNSYLVANIA.

BEAN-SNIPPING MACHINE.

1,359,559.  Specification of Letters Patent.  Patented Nov. 23, 1920.

Application filed August 12, 1919. Serial No. 317,030.

*To all whom it may concern:*

Be it known that I, ARTHUR P. WOLFE, a citizen of the United States, and a resident of Philadelphia, in the county of Philadelphia and State of Pennsylvania, have invented an Improvement in Bean-Snipping Machines, of which the following is a specification.

This invention relates to machines for snipping off the ends of string beans which afterward are to be used for canning or other purposes. It has for its object, generally, to provide a machine for the purpose stated which is comparatively simple in construction and which is efficient and reliable in operation.

The invention also has for its objects to provide an improved and novel means for feeding beans from a hopper to the portion of the machine wherein their ends are snipped off; to provide novel and efficient means for properly placing the beans upon a movable part of the machine and presenting the ends thereof to cutters for snipping off such ends, the said beans being carried by the said movable part to the cutters; to provide a novel arrangement of cutting means for snipping off the ends of the beans; and also to provide a novel means for discharging the beans from the machine after their ends have been snipped off.

Other objects of the invention will be referred to and pointed out in the detailed description thereof which follows or will be apparent from such description.

In order that the invention may be readily understood and its practical advantages fully appreciated, reference may be had to the accompanying drawing in which I have illustrated certain convenient forms of embodiment thereof. It will be understood, however, that the invention is susceptible of embodiment in other forms of construction than those shown and that changes in the details of construction may be made within the scope of the claims without departing from the said invention.

In the drawings:

Fig. 2 is a side elevation of the same looking toward the bottom of Fig. 1;

Fig. 3 is a view in elevation taken from the opposite side of the machine from that from which Fig. 2 is taken;

Fig. 4 is a longitudinal, sectional view of a hopper and vibratable means for feeding the beans from said hopper to the machine wherein the ends are snipped off;

Figure 1:
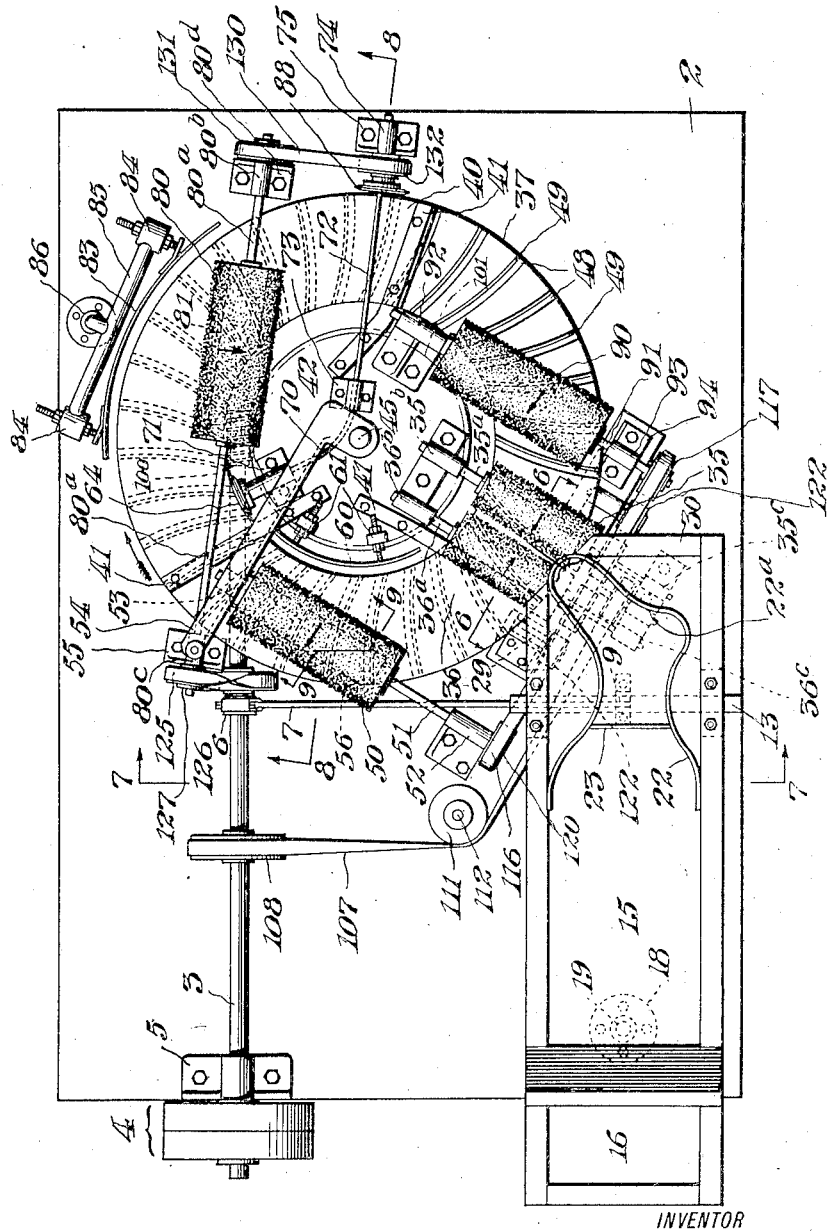
Figure 1 is a top plan view of a machine constructed in accordance with my invention.

Fig. 4ª is a similar view showing a slightly modified construction;

Fig. 5 is a top plan view of the lower end of the chute or run-way along which the beans travel from the hopper to the machine, and showing means for causing the beans to be delivered singly or one at a time;

Fig. 6 is a view taken on the line 6—6 of Fig. 1;

Fig. 7 is a transverse, sectional view taken on the line 7—7 of Fig. 1 to show the means for causing vibration of the bean feeding chute, other parts of the machine being omitted for the sake of clearness;

Fig. 8 is a vertical, transverse, sectional view taken on the line 8—8 of Fig. 1;

Fig. 9 is a sectional view taken on the line 9—9 of Fig. 1, said view showing two bean pods, one being in one position upon the movable carrier and the other in another position thereon; and Fig. 10 is a top plan view of a modified construction of machine embodying my invention.

Referring to Figs. 1 to 9 of the drawings: 1 designates legs upon which a table 2 is supported. The latter is provided with suitable supports and bearings for the operative parts of the machine, as will be hereinafter, from time to time, pointed out.

3 designates the main driving shaft having fast and loose pulleys 4. The said shaft is supported in bearings 5 which in turn are supported upon the table 2.

The shaft 3 is provided with an eccentric at 6 from which extends a rod or bar 7, the outer end of which is connected as indicated at 8 to a pivoted up-right arm or lever 9. To vary the extent of oscillating or vibrating movement of the upper end of the arm or lever 9, I have provided the latter with several openings as indicated, whereby the connecting rod or bar 7 may be connected to said arm or lever at different distances from its pivot. The upper end of the arm or lever 9 is pivotally connected at 10 to a member 11, which in turn is pivoted at 12 to a cross bar 13, the opposite ends of which are adapted to be adjustably secured by means of clamps 14 to the opposite sides of a feed chute or run-way 15, provided with a hopper 16 at its upper, outer end into which the beans, the ends of which are to be snipped off, are delivered. The beans escape from the said hopper through an opening 17 at the lower edge portion of the inner or front wall thereof. The outer, upper end of the chute 15 is pivotally supported upon a hollow post or standard 18 which rises from the table 2.

The said chute or run-way 15 is provided with a depending rod 19 which is adapted to extend into the hollow upper end of the post 18. The said rod is provided with an adjustable collar 20, the lower edge of which rests upon the upper end of the said post 18. By adjusting the collar to different positions upon the depending rod 19, the outer, upper end of the chute or run-way 15 may be raised or lowered, as is obvious. The vibratory or oscillatory movement of the arm or lever 9 effects a corresponding movement of the chute or run-way 15. By loosening the clamps 14, the chute 15 may be adjusted to different positions with respect to the bar 13.

To control and effect the delivery, one at a time, of the beans from the chute or runway, I have provided a device 22 consisting of a strip of sheet metal or other suitable material which should be bent into substantially the shape shown in Figs. 1 and 5, the opposite sides of which are curved and shaped so as to be adapted more or less to the shape of the bean pods which are usually slightly bent or curved, and which bean pods, as they move downwardly toward the delivery end of the device 22, are apt to travel in proximity to one side or the other of the said device. It will be observed that one side of the device 22 is provided at $22^a$ with an inwardly bent portion. The ends of the beans, as they travel downwardly along the chute 15 and between the opposite sides of the member 22, strike the said inwardly bent portion and are deflected toward the left (having reference to Fig. 5) and toward the outlet at the toe of the said device. In order to prevent the beans from piling up in the lower end of the feed control device 22, I have provided the cross piece 23, the lower edge of which is spaced a short distance above the bottom of the chute or runway 15, as indicated at 24. The spacing of the lower edge of the said cross piece from the bottom of the chute or run-way is just sufficient to permit the beans to pass freely thereunder. Instead of the cross piece 23, I may substitute therefor a brush roller 25, the lower side of which is spaced a short distance from the bottom of the chute or run-way 15, as shown in Fig. $4^a$. The said roller is rotated by any suitable means, not shown, and such rotation is in a direction to keep the beans pushed back in the chute and to prevent the piling up of the beans in the lower end of the feed control device 22.

One corner of the lower end of the chute is cut off as indicated at 27 and the bottom of the said chute is provided with a curved notch 28 intermediate the inner edges of the cut off ends of the adjacent side and end walls 29 and 30 of the feed chute. The lower end of the feed control device 22 is curved and more or less contracted, as shown, constituting what I have previously termed the toe, and projects into the space between the adjacent edges of the ends of the side and end walls 29 and 30, and is provided with a notch having a relatively wide portion $30^a$ and a relatively narrow portion 31. The fresh, relatively green bean pods, which it is desired to deliver to the machine to have their ends snipped off, escape through the relatively small portion 31 of the notch, but beans which are too mature and which are regarded as being too old for canning purposes, and which it is desired by the canner shall be discarded, are discharged downwardly through the notch 28 and the relatively large portion $30^a$ of the notch in the lower, contracted, curved end portion of the feed control device 22. The beans which are too old to be desirable for canning purposes are, as is known, crookeder, that is, curved to a greater extent than the relatively fresh, green beans. Consequently when such relatively old bean pods reach the delivery opening at the lower end of the feed control device 22, instead of passing out through the relatively small portion 31 of the notch in the lower end of the device 22, their forward ends bend down into and pass out through the notch 28 and are not delivered into the portion of the machine in which the ends are snipped off. The relatively fresh, green beans, the pods of which are relatively straight, although as is known, they are generally slightly curved, the curvature varying, pass out through the notch in the lower edge portion of the lower end of the feed control device 22 and are delivered between a couple of rotating brushes 35 and 36, said brushes being spaced a short distance from each other as shown and rotating toward each other as indicated by the arrows. These brushes are supported upon shafts $35^a$ and $36^a$, mounted at their inner ends in bearings $35^b$ and $36^b$, and at their outer ends in bearings $35^c$ and $36^c$.

The beans are delivered between these brushes singly or one by one, and are fed by the latter downwardly onto the annular moving part or carrier 37, which may be described as a dial, which rotates toward the right, having reference to Fig. 1 of the drawings, in the direction of the hands of a watch. The beans, as they are carried forward, pass immediately underneath a cover 40 of suitable material, such as sheet rubber or rubber fabric, supported in any suitable manner as by means of clamping bars 41 at its opposite ends and near its center, the inner ends of said clamping bars being secured to a supporting circular plate 42, provided at its center with a short sleeve or hub portion 43 which is secured by means of a binding screw 44 to a central, stationary post or standard 45, the lower end of which extends into a tubular member 45ª and is secured therein by means of a binding screw 46. The member 45ª is secured to and supported upon the table 2.

As the dial or carrier rotates, the upper sides of the bean pods which have been delivered thereto as described, contact more or less lightly with the bottom surface of the cover 40, with the result that the beans which have not already been deposited in the slightly curved grooves 48 in the top surface of the rotatable dial or carrier 37, are rolled over, or at least have a tendency to roll over, until they are placed or positioned in said grooves. The grooves 48 are slightly curved as indicated in Fig. 1, so as to adapt them, to a certain extent, to the shape of the bean pods which may be placed therein. It will be noted also that these grooves are not radial with respect to the axis of rotation of the circular member 37, but extend tangentially with respect to a circle concentric with said center or at acute angles with respect to the radii of said member.

Associated with each of the grooves 48 is a rib 49 situated at the rear side or rear edge of the said grooves, having reference to the direction in which the dial or carrier 37 rotates. The purpose of these ribs is to form abutments, so to speak, to halt the rearward movement of the beans with reference to the rotation of the dial or carrier 37 to aid in positioning the same for the cutters to be hereinafter referred to and described.

As the dial or carrier 37 travels forwardly the beans which are situated underneath the cover 40 are first carried underneath one end portion of a rotating cylindrical brush 50 secured upon a shaft 51 supported in bearings at 52 and 53, the latter being supported upon a supporting bar 54, the inner end of which is secured to and supported upon the upper end of the post or standard 45. The outer end of the bar 54 is supported upon the upper end of a post 55. The brush 50 rotates in the direction of the arrow shown in Fig. 1. The lower side of the brush 50 extends through a slot 56 in the cover 40 and contacts with the upper side of the dial or carrier 37. If when the beans first start underneath the front end portion of the cylindrical brush 50 they have not previously fallen into or been positioned in the grooves 48, the said brush tends to and does aid in causing them to move into the said grooves.

In Fig. 9 the bean pod shown upon the right hand side of said figure is shown as being just outside of its adjacent groove, while the next bean pod shown in the next groove is shown as having been pushed into or positioned in the groove of the compartment in which said bean is located.

The brush 50, rotating in the direction indicated, causes movement of the beans inwardly so as to position their ends against a curved gage 60 adjustably supported adjacent the inner edge of the dial 37 in supports at 61 upon the supporting platform 42. The beans are carried along with their inner ends against the gage 60 to a rotatable cutter 64 located adjacent the inner edge of the annular movable part or carrier 37. This cutter operates to snip off the adjacent inner ends of the bean pods as they are carried along by the said carrier. The cutter 64 is connected to the inner end of a flexible shaft 70. The inner end of said shaft is supported in a bearing 71 upon the supporting platform 42, and is connected at its outer end to the inner end of a rigid shaft 72 supported in bearings 73 and 74, the former being located upon the platform 42 and the latter at the upper end of a post 75 rising from the table 2.

After the inner ends of the beams have been snipped off by the rotary cutter 64, they are carried forward underneath the rotary cylindrical brush 80, the lower side of which projects through an opening 81 in the cover 40 and contacts with the top side or surface of the rotatable carrier 37. The brush 80 is secured upon a shaft 80ª which is supported at its opposite ends in bearings 80ᵇ and 80ᶜ. The bearing 80ᵇ is situated at the upper end of a post or standard 80ᵈ supported upon the table 2 while the bearing 80ᶜ is supported at the upper end of the post 55.

As indicated by the arrow thereon, the brush 80 rotates in the direction to move the beans outwardly in the grooves 49 so as to cause their outer ends to contact with the external gage 83 supported upon adjustable supports 84, mounted in the opposite ends of a cross piece 85 at the upper end of a post or standard 86 secured at its lower end to the table 2. The forward end of the gage 83 terminates a distance from a rotary knife or cutter 88 mounted upon and secured to the shaft 72 which operates to snip off the outer ends of the beans as they are carried past the same by the rotary carrier 37. After the outer ends of the bean pods have been snipped off by the cutter 88 they are carried forward into the space intermediate the opposite, opposing ends of the cover 40 in which open space a rotatable, cylindrical brush 90 is situated, said brush rotating in a direction as indicated by the arrow to sweep the beans outwardly in the grooves 48 so as to discharge them from the carrier 37. The brush 90 is secured upon a shaft 91 supported at its opposite ends in bearings 92 and 93, the former being in turn supported upon the platform 42 and the latter upon the upper end of a post 94 secured at its lower end to the table 2. The lower side of this brush contacts with the top side or surface of the carrier 37.

Preferably the bristles of the brushes 50, 80 and 90 should be secured to the cores or carriers thereof in directions extending tangentially of a cylindrical surface concentric with the axis of such carriers or cores, as indicated in Fig. 9 of the drawings, so that as the brushes are rotated the bristles thereof which are in contact with the adjacent opposing surface of the carrier 37 do not extend at right angles to the plane of said carrier, but, on the contrary, form therewith angles obtuse upon one side and acute on the other of the respective bristles. When so arranged, the bristles of the brushes sweep down upon and tend to press the beans against the top surface of the carrier 37. If the bristles were radially arranged with respect to their axes of rotation there would be a tendency thereof to lift the bean pods from the surface. While I have shown the bristles of the brushes 50, 80 and 90 arranged as described, it will be understood that they may be otherwise arranged and that, although not preferable, they may be radially arranged with respect to their axes.

The bristles of the brushes 35 and 36 are shown as being radially arranged with respect to their axes, but this is not objectionable with respect to these brushes because they are not located or positioned to rotate in contact with the adjacent opposing surface of the carrier 37. Their lower sides, as previously stated, are situated in a plane corresponding substantially with the upper edges of the ribs 49.

It will be observed that as the beans are delivered from the feed chute or run-way, their outer ends are situated adjacent the outer peripheral edge of the carrier 37. It is desirable therefore that the brush 50 should first contact with the outer end portions of these beans. For that reason the brush 50 is located with its outer end adjacent to the outer peripheral edge of the rotatable dial or carrier 37 and extends inwardly over the said dial or carrier at an angle to the radii thereof and in the direction of rotation of the same, its inner end terminating a substantial distance from the outer peripheral edge of the said dial or carrier. It will be noted that the said brush is situated a relatively short distance from or in advance of the feed rollers 35 and 36. In consequence of this arrangement, it will be noted that the outer ends of the beans, as they are carried forward from the feed roller brushes by the dial or carrier, are first acted upon by said brush, and that as they are carried along under the same they are pushed forward so as to cause their inner ends to abut against the gage 60, even though they may be quite short. When we come to the brush 80, we find that its relative situation or position with respect to the rotatable dial or carrier 37 is similar to that of the brush 50 except that its inner end is located further inwardly from the outer peripheral edge of the said dial or carrier than is the case with the brush 50; and also except that it extends in a direction opposite to that in which the dial 37 rotates. As the beans are carried forward from the brush 50, their inner ends are first brought into contact with the brush 80 and the latter, rotating in the direction of the arrow thereon, causes an outward movement of the said beans so as to press their outer ends against the gage 83 to thereby place them in position to have their outer ends snipped off by the cutter 88.

From the cutter 88 the beans are carried forward to the brush 90, the relative position of which with respect to the rotating dial or carrier 37 is substantially the same as in the case of the brush 80, so that the inner ends of the beans are first brought into contact with the said brush 90 and are discharged thereby from off the dial or carrier. The brush 90 is situated in the space between the opposite opposing ends of the cover 40.

I shall now describe the means and manner of affecting rotation of the annular dial or carrier 37, the several rollers 35, 36, 50, 80 and 90 and the rotary cutters 64 and 88.

To effect rotation of the carrier 37, I have provided a worm 100 upon the inner end of the shaft 3 which is in engagement with a worm wheel or gear 101 supported upon a spider 102, integrally or otherwise connected with a sleeve 103 rotatably supported upon the post 45. Near its upper end the sleeve 103 is provided with a spider 104 upon the outer ends of which the rim 105 is secured. The horizontally arranged carrier 37 is integrally or otherwise secured to the upper edge of the circular rim 105. It is apparent that as the worm 100 is rotated, rotation of the worm gear 101 is effected to cause corresponding rotation of the carrier 37. In order to effect rotation of the several brushes 35, 36, 50 and 90, I have provided the driving belt 107 which extends over a driving wheel 108 on the shaft 3 and over a wheel 109 upon a shaft 110 supported in bearings which are in turn supported upon the table 2. The intermediate portions of the belt are guided by horizontal guide wheels 111 supported upon a post 112 rising from the table 2. The shaft 110, driven by the belt 107, is provided with a driving wheel 115 which drives an endless belt 116 which travels around a wheel 117 upon the front end of the shaft 91, thence over a wheel 118 upon the front end of the shaft 35ª and thence underneath and in driving engagement with a wheel 119 secured to the front end of the shaft 36ª and thence over a wheel 120 secured to the outer or forward end of the shaft 51. 122 designates take-up rolls bearing upon the outer sides of the belt 116. It is apparent that rotation of the shaft 3, together with the driving wheel 108 thereon, drives the belt 107. The latter operates to drive the shaft 110 which in turn operates to drive the belt 116, and the latter being in engagement with the wheels 117, 118, 119 and 120, effects or causes rotation of the rotatable brushes 90, 35, 36 and 50.

To effect rotation of the brush 80, I have provided an endless driving belt 125 driven by means of a wheel 126 upon the main driving shaft 3. Said belt engages a wheel 127 upon the end of the shaft 80ª. It is apparent, therefore, that rotation of the latter and consequently of the brush 80 is effected by the driving belt 125 which is driven from the wheel 126 upon the main driving shaft 3.

Rotation of the rotary cutters is effected by means of a belt 130 driven by means of wheel 131 upon the right hand end of the shaft 80 (having reference to Fig. 1), said belt passing over a wheel 132 upon the outer end of the shaft 72. Rotation of the latter shaft by means of the belt 130 effects rotation of the cutter 88 which is secured upon the said shaft 72. The latter shaft is connected by means of the flexible driving shaft 70 to the cutter 64 so that revolution of the shaft 72 causes rotation or revolution of the cutter 64.

Although I have described the rotary cylindrical brushes 50 and 80 for moving and positioning the beans against the gages 60 and 83 respectively, it will be understood that any other suitable and preferred means may be employed for that purpose. For instance, in view of the fact that the cover 40 contacts with the upper edges of the ribs 49 and forms with said ribs and the opposing portions of the top surface of the carrier 37 what may be defined or described as tubular spaces, the said beans may be caused to move first inwardly against the gage 60 by means of compressed air and thereafter outwardly or in the opposite direction against the gage 83 by the same means.

In the modified construction shown in Fig. 10, I have substituted for the annular carrier 37 an endless belt carrier 140 provided with grooves 141 and ribs 142 corresponding to the grooves 48 and ribs 49 of the carrier 37. The upper part of the belt 140 travels in the direction indicated by the arrow 143. The beans are fed onto the belt at any suitable point to the left of the rotating brush 144, which brush rotates in contact with the top surface of the conveyer belt 140. Preferably the said belt is covered with a suitable covering corresponding to the cover 40 shown in the construction previously described and such cover causes the said beans to roll into the grooves 141 in a manner similar to that described in connection with the cover 40. The brush 144 rotates in a direction indicated by the arrow 145 to cause longitudinal movement of the beans in the grooves 141 so as to cause their opposite ends to contact with the gage 153 supported in any suitable manner. The beans are then carried forward to the rotating cutter 154 supporting upon the rotatable shaft 155.

156 designates a driving shaft of the construction shown in Fig. 10, provided with a driving wheel 157. The inner end of the shaft 156 is provided with a bevel gear 160 which is in engagement with a bevel 161 upon a shaft 162. The outer end of said shaft is provided with a driving wheel 163 which drives an endless belt 164 which extends around a wheel 165 upon the outer end of the shaft which supports the brush 144. The opposite end of the shaft 162 is provided with a bevel gear 167 which is in engagement with a bevel gear 168 upon the shaft 150. Driving of the latter effects rotation of the cutter 148. The shaft 150 is provided with a wheel 170 which drives a belt 171 which belt passes over a wheel 172 and drives the same to effect rotation of the shaft 155 and consequently of the rotary cutter 154.

While I have illustrated my invention as embodied in a bean snipping machine and have described it for that purpose, it will be understood that it is not limited to that particular use or purpose but, on the contrary, its principles of operation may be embodied in machines of like character for use for other analogous purposes.

I claim:

1. In a bean snipping machine, the combination of a traveling carrier, feed brushes situated in operative relation to said carrier, and means for feeding string beans to said brushes, the latter depositing the same upon the said carrier.

2. In a bean snipping machine, the combination of a movable carrier, rotatable feed brushes situated over the said carrier, and means for feeding string beans singly to the said brushes.

3. In a bean snipping machine, the combination of a rotatable dial and feed brushes situated over and spaced a short distance from the said dial for delivery of string beans to the said dial.

4. In a bean snipping machine, the combination of a rotatable carrier having ribs locating at intervals thereon and extending transversely thereof, a stationary cover for a portion of said carrier, said cover being situated near or in contact with the top edges of the said ribs and stationary feed brushes situated adjacent one end of the said cover.

5. In a bean snipping machine, the combination of a rotatable annular member having curved grooves situated in the top side thereof and a rib adjacent one side of each of said grooves, a cover for a portion of said carrier, said cover being situated adjacent or in contact with the top edges of said ribs.

6. In a bean snipping machine, the combination of a rotatable annular member having curved grooves situated in the top side thereof and a rib adjacent one side of each of said grooves, a cover for a portion of said carrier, said cover being situated adjacent or in contact with the top edges of said ribs, and feed rolls situated adjacent one end of said cover to deliver string beans thereunder.

7. In a machine for snipping string beans, the combination of a rotatable dial cut out at the center and having grooves in its top side and ribs, one rib being adjacent the rear side of each groove, a cover for a portion of the said dial, means for supporting the said cover in contact with or near the top edges of said ribs, and rotatable feed brushes situated adjacent to one end of said cover for delivering string beans singly thereunder.

8. In a machine for snipping string beans, the combination of a rotatable horizontal dial, means for delivering beans thereto, said dial having means for causing said beans to be carried forward thereon away from their point of delivery, means for moving said beans longitudinally first in one direction, means operating after an interval of further travel to move said beans longitudinally in the opposite direction, and means for snipping the ends off of said beans.

9. In a machine for snipping string beans, the combination of a rotatable annular carrier, means for delivering beans thereto, said carrier having means for causing the said beans to be carried forward thereon from their point of delivery, cutters located adjacent the inner and outer edges of said annular carrier, and means for shifting the beans, first to one cutter and then to the other, to permit their opposite ends to be snipped off.

10. In a machine for snipping off the ends of string beans, the combination of a movable carrier, means for delivering beans to said carrier, the latter being provided with means for causing the said beans to be carried thereon beyond their point of delivery, a rotatable member situated over the said carrier a distance from the point of delivery of the beans thereon, said member extending transversely of the position of the beans on the said carrier, and having its outer end situated at the outer edge of said carrier and the inner edge a distance from such outer edge whereby the outer edge of said beans will be the first to come in contact with the said member, and the second rotatable member situated beyond the first named member, having its inner end situated adjacent the inner edge of said carrier and its outer end a distance from said inner edge whereby the inner end of said beans first contact with the said second member and are thereby shifted outwardly upon the said carrier.

11. In a machine for snipping off the ends of string beans, the combination of a rotatable dial, means for delivering beans singly thereto, a rotatable brush situated over and in contact with the said dial and extending from its outer end inwardly in the direction of rotation of said dial, said brush being arranged at an angle to the radii of said dial, and a second brush beyond the first named brush situated over and in contact with the said dial, the said second brush extending inwardly and in a direction opposite that of the rotation of the said dial, said brush extending at an angle to the radii of said dial.

12. In a machine for snipping off the ends of string beans, the combination of a dial, means for delivering beans singly thereto, a rotatable brush situated over and adapted to contact with the said dial, said brush extending from a point adjacent the outer edge of said dial inwardly and in a direction of rotation thereof at an angle to the radii of the said dial, a second rotatable brush located beyond the first named brush the outer end of which is situated adjacent to the outer edge of said dial and said brush extending inwardly and in a direction opposite to that of the direction of rotation of the said dial and over and in contact therewith, and means for causing rotation of said brushes, the first outwardly and the second inwardly.

13. In a machine for snipping off the ends of string beans, the combination of a dial, means for delivering beans singly thereto, a a rotatable brush situated over and adapted to contact with the said dial, said brush extending from a point adjacent the outer edge of said dial inwardly and in a direction of rotation thereof at an angle to the radii of the said dial, a second rotatable brush located beyond the first named brush, the outer end of which is situated adjacent to the outer edge of said dial and said brush extending inwardly and in a direction opposite to that of the direction of rotation of the said dial and over and in contact therewith, means for causing rotation of the said brushes, the first outwardly and the second inwardly, and cutters for snipping off the ends of said beans, one of the said cutters being located adjacent the inner edge of the said dial and intermediate the said brushes, and the other adjacent the outer edge of said dial beyond the second named brush, and another brush located with its outer end adjacent the outer edge of said dial beyond the second named brush and extending inwardly at an angle to the radii of said dial in a direction opposite the direction of rotation thereof and over and in adjacent relation thereto.

14. In a machine for snipping off the ends of string beans, the combination of a dial, means for delivering beans thereto, a cover situated over a portion of the said dial said cover being provided with a couple of slots therein, rotatable cylindrical brushes projecting into the said slots and contacting with the said dial, one of the said brushes rotating toward the outer edge of the said dial to effect inward adjustment of the beans upon the said dial and the other of said brushes rotating toward the center of said dial to effect outward movement of said beans toward the outer edge thereof.

15. In a machine for snipping off the ends of string beans, the combination of a dial, means for delivering beans thereto, a cover situated over a portion of the said dial, said cover being provided with a couple of openings therein, rotatable cylindrical brushes projecting into the said openings and contacting with the said dial, one of the said brushes rotating toward the outer edge of the said dial to effect inward adjustment of the beans upon the said dial and the other of said brushes rotating toward the center of said dial to effect outward movement of said beans toward the outer edge thereof, and inner and outer cutters for snipping off the inner and outer ends of the beans upon said dial.

16. In a machine for snipping off the ends of string beans, the combination of a rotatable annular carrier, rotatable cylindrical yielding members adjacent and in parallel relation to each other for receiving and delivering beans to the said carrier, a cover for a portion of said carrier, said cover being situated near the upper side of said carrier and one end of said cover terminating adjacent one of the said yielding members, said cover being provided with a couple of openings arranged at angles to the radii of the said annular carrier, cylindrical rotatable brushes projecting into the said openings, means for rotating the said brush in the opening nearest the said yielding members in a direction toward the outer edge of said carrier and means for rotating the other of said brushes in the opposite direction.

17. In a machine for snipping off the ends of string beans, the combination of an annular carrier, means for delivering beans to the said carrier, cutters, one of which is situated adjacent the inner edge of said carrier and the other one of which is situated adjacent the outer edge of said carrier, means for operating the said cutters, means for shifting the said beans inwardly into position to have their inner ends snipped off by the cutter adjacent the inner edge of said carrier, and means for shifting the said beans outwardly upon the said carrier into position to have their outer ends snipped off by the cutter adjacent the outer edge of said carrier.

18. In a machine for snipping off the ends of string beans, the combination of a rotatable annular carrier, means for delivering beans singly thereto, cutters, one of which is situated adjacent the inner edge of said carrier a distance from the point of delivery of the beans thereto, the other of said cutters being situated adjacent the outer edge of said carrier a greater distance from their point of delivery thereto, adjustable gages, one of which is situated in front of the first named cutter adjacent the inner edge of said carrier and the other one of which is situated in front of said cutter adjacent the outer edge of said carrier, means for shifting the beans inwardly to press their inner ends against the first named gage and means for shifting them in the opposite direction to press their outer ends against the second named gage.

19. In a machine for snipping off the ends of string beans, the combination of a rotatable annular carrier, means for delivering beans thereto, rotatable cutters, one of which is situated adjacent the inner edge of said annular carrier and the other one of which is situated adjacent the outer edge of said annular carrier, a rotatable shaft common to said cutters for supporting the same and causing rotation thereof, means for shifting the beans inwardly upon the said carrier to place their inner ends in position to be snipped off by the first named cutter and means for shifting them in the opposite direction to place their outer ends in position to be snipped off by the second named cutter.

20. In a machine for snipping off the ends of string beans, the combination of a rotatable dial having an open center, said dial being provided with curved ribs and grooves located at intervals upon its top side, means for causing rotation of said dial, a cover supported above said dial and in contact with the top edges of the said ribs, said cover extending over only a portion of the said dial and the said cover being provided with a plurality of openings, one of said openings extending from adjacent the outer edge of the said cover inwardly and transversely of the radii of the said dial and in the direction of rotation thereof and the outer end of the other of said openings being situated adjacent the outer edge of said cover and extending inwardly and transversely of the radii of said dial and in a direction opposite the direction of rotation thereof, brushes projecting into said openings and contacting with said dial, the brush in the first of said openings rotating toward the outer edge of said dial and the other of said brushes rotating toward the inner edge of said dial, said brushes operating to shift the beans first inwardly and then outwardly upon the said dial, and a brush contacting with the said dial intermediate the opposite opposing ends of the said cover and operating to discharge the snipped beans therefrom.

In testimony that I claim the foregoing as my invention, I have hereunto set my hand this 7th day of August, A. D., 1919.

ARTHUR P. WOLFE.